United States Patent [19]
Weiffenbach

[11] 3,942,817
[45] Mar. 9, 1976

[54] EXTENSION FOR CAR FRAME

[76] Inventor: Conrad K. Weiffenbach, 5483 Shimerville Road, Clarence, N.Y. 14031

[22] Filed: Apr. 30, 1975

[21] Appl. No.: 573,124

[52] U.S. Cl. ........... 280/106 R; 280/34 R; 280/80 R
[51] Int. Cl.² ......................................... B62D 21/02
[58] Field of Search ......... 280/106 R, 106 T, 34 R, 280/287, 80 R; 180/89 R, 24.02

[56] References Cited
UNITED STATES PATENTS

| | | | |
|---|---|---|---|
| 1,366,771 | 1/1921 | Devencenzi | 280/34 R |
| 1,419,160 | 6/1922 | McKinnon | 280/34 R |
| 2,154,957 | 4/1939 | Pinard | 280/80 R |
| 3,188,110 | 6/1965 | Wessells | 280/106 R |
| 3,678,864 | 7/1972 | Gutridge | 180/89 R |

*Primary Examiner*—Philip Goodman
*Assistant Examiner*—John A. Carroll
*Attorney, Agent, or Firm*—Bean & Bean

[57] ABSTRACT

A unit for extending the length of the frame, ie. wheel base, of a VW to accommodate the frame for mounting long front hood car bodies.

7 Claims, 3 Drawing Figures

EXTENSION FOR CAR FRAME

BACKGROUND OF THE INVENTION

During recent years, numerous companies have marketed "antique" and "futuristic" car kits, which include molded fiber glass bodies adapted to be mounted on the frame or chassis of a stripped down VW "bug".

While sales of these kits have been substantial, they have been limited to a great extent to auto enthusiasts who either have the ability and time or sufficient money to hire others to make the substantial structural revisions required to accommodate the VW frame to receive the kit body. These revisions include for instance the relocation of the driver seat, steering wheel, brake and foot pedals and gear shift, which are required to accommodate the short front hood-up front seating arrangement of the VW to long hood-rear seating arrangements of many sports car kit designs.

SUMMARY OF THE INVENTION

The present invention is directed towards a unit for extending the frame of a VW, ie. the wheel base, in order to permit a long front hood type car body to be accommodated on the VW frame without the necessity of relocating the driver's seat, etc. Specifically, the unit of the present invention is formed with an attaching or first assembly including rear attachment tubes adapted to be clampingly attached to the conventional front axle assembly mounting bracket of a VW frame and an attachment or second assembly including front attachment channels to which the front axle assembly of the VW may in turn be clamped. The rear attachment tubes and front attachment channels are cantilever connected by a pair of vertically disposed side plates, which preferably converge in a forward direction.

Alternatively, the present invention may be employed to accommodate a VW frame to receive relatively "long bodied" antique or "futuristic" car designs, ie. upwards of about two feet in excess of the standard length of a VW, whether or not such designs have long or short front hoods.

DRAWINGS

The nature and mode of operation of the present invention will now be more fully described in the following detailed description taken with the accompanying drawings wherein.

DETAILED DESCRIPTION

Figure 1:
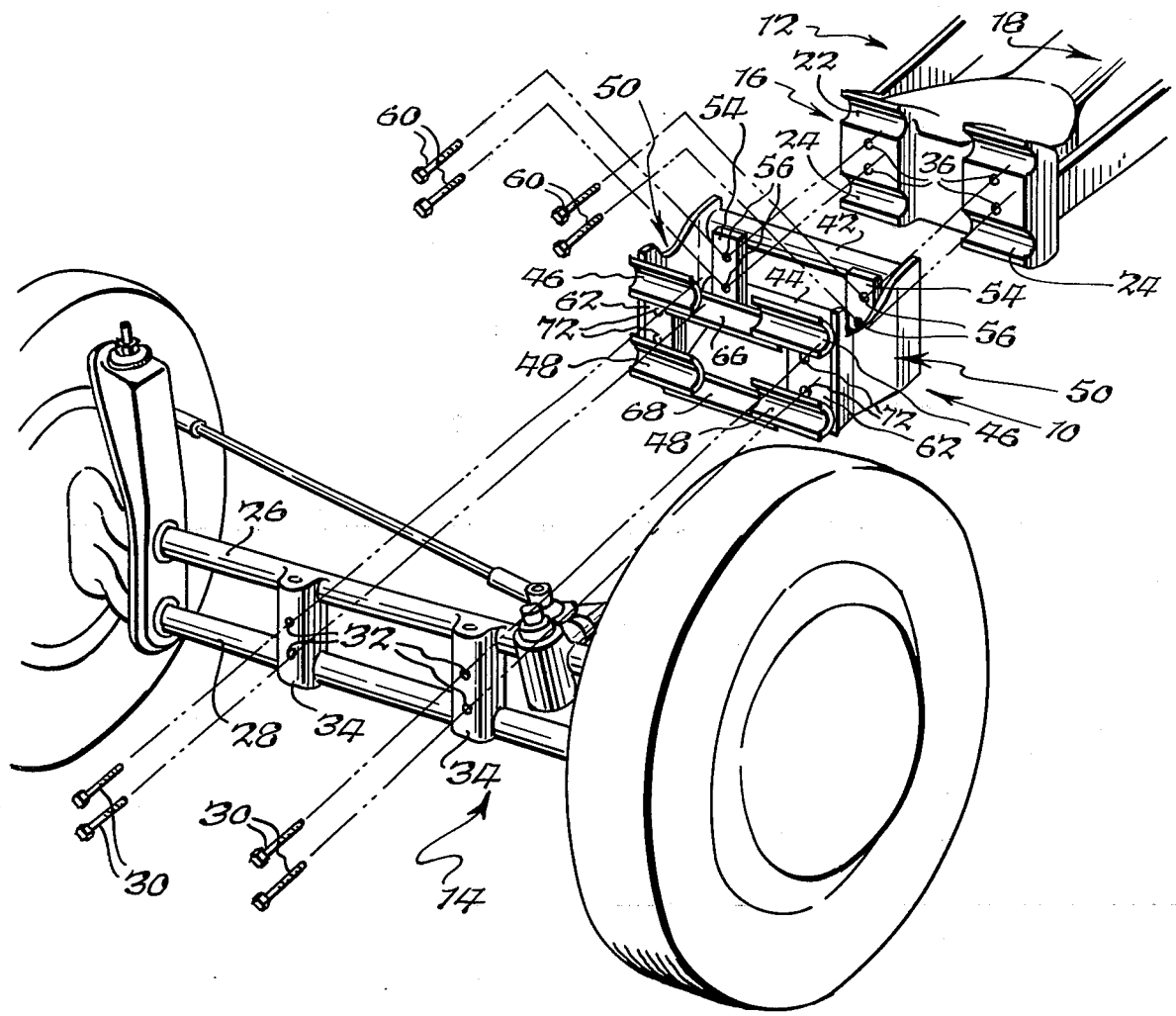
FIG. 1 is an exploded perspective view showing the extension unit of the present invention in association with the front axle assembly and front axle assembly mounting bracket of a conventional VW.

Reference is now made particularly to FIG. 1 in which the extension unit of the present invention is generally designated as 10 and shown in association with the frame 12 and the front axle assembly 14 of a VW "bug".

As is conventional, frame 12 includes a bracket or weldment 16 fixed to the front end of a backbone or tubular structure 18. Bracket 16 is formed with upper and lower pairs of aligned, elongated concave mounting surfaces 22 and 24, which are sized and spaced to receive upper and lower axle tubes 26 and 28, respectively, of front axle assembly 14. In a conventional VW construction, assembly 14 is clamped to bracket 16 by four bolts 30, which extend through bore openings 32 formed in a pair of vertical upstanding axle tube joining posts 34 and into threaded openings 36 formed in bracket 16.

Extension unit 10 generally comprises upper and lower rear attaching devices, which are preferably in the form of tubes 42 and 44, serving to define rearwardly facing convex attaching surfaces sized and arranged to be received within bracket mounting surfaces 22 and 24; upper and lower front attachment devices, which are preferably in the form of pairs of aligned attachment channels or "split" tubes 46 and 48, serving to define forwardly facing, concave front attachment surfaces sized and arranged to receive upper and lower axle tubes 26 and 28, respectively; and a pair of vertically disposed and horizontally spaced cantilever or extension plates 50, which serves to rigidly interconnect tubes 42 and 44 and channels 46 and 48 in a horizontally spaced, essentially parallel relationship.

Figure 2:
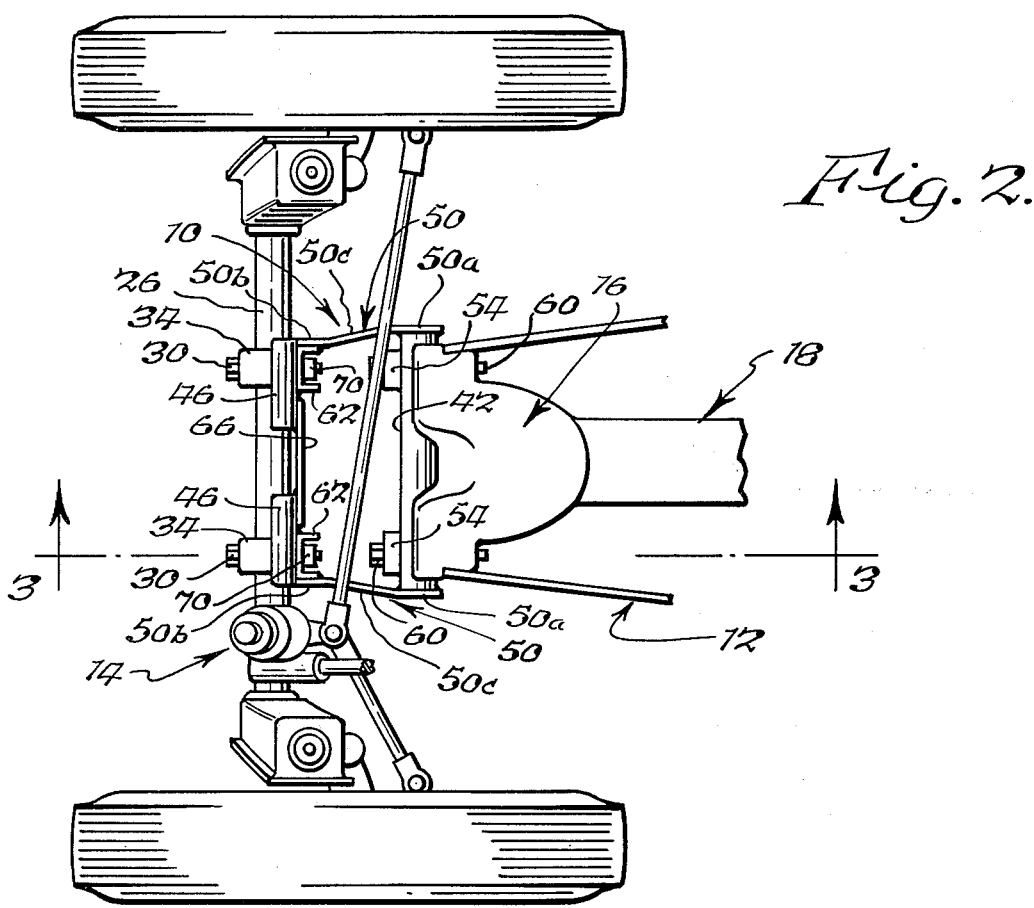
FIG. 2 is a top plan view of the extension unit.
Figure 3:
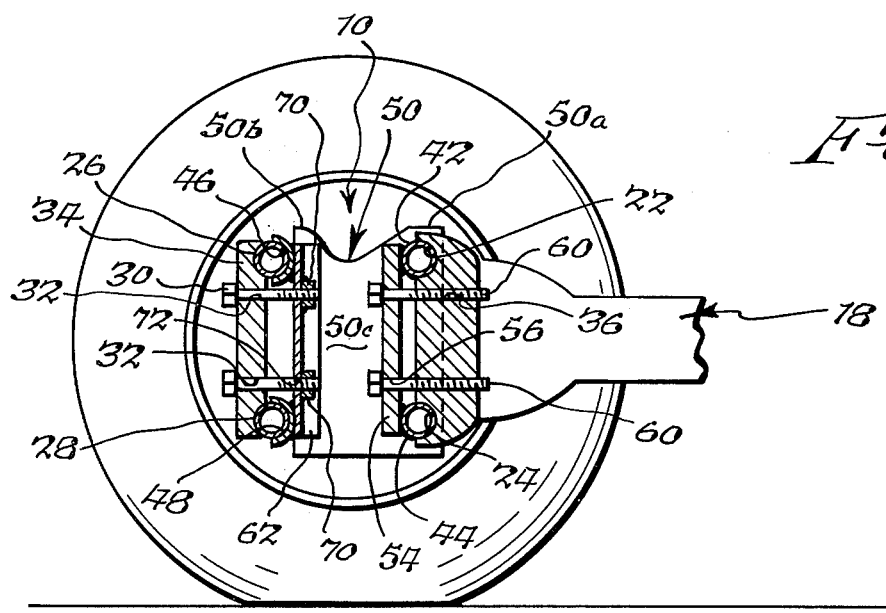
FIG. 3 is a sectional view taken generally along the line 3—3 of FIG. 2.

More specifically, attaching tubes 42 and 44 are best shown in FIGS. 2 and 3 as being maintained in a vertically spaced, parallel relationship relative to one another by plates 50, which are welded to their opposite ends, and by a pair of parallel rear attaching posts 54, which are vertically disposed and have their rear surfaces welded to the forwardly facing surfaces of the attaching tubes. Attaching posts 54 are formed with through openings 56, which receive bolts 60 adapted to be fitted into bracket openings 36 for the purpose of clamping tubes 42 and 44 within and against casting mounting surfaces 22 and 24, respectively. Tubes 42 and 44, and attaching posts 54 may be considered as cooperating to define an attaching or first assembly.

Channels 46 and 48 are maintained in a vertically spaced, parallel relationship relative to one another by having their outer ends weld affixed to a pair of vertically upstanding, generally U-shaped front attachment posts 62, which are in turn welded to facing surfaces of plates 50. Further, channels 46 and 48 are preferably welded adjacent their inner ends to opposite ends of upper and lower angle iron braces 66 and 68, respectively. Alternately, braces 66 and 68 may be omitted and each pair of channels may be replaced by a single channel or "split" tube having its opposite ends welded to front attachment posts 62 or directly to facing surfaces of plates 50. Channels 46 and 48, attachment posts 62 and braces 66 and 68 may be considered as cooperating to define an attachment or second assembly.

By again referring to FIGS. 2 and 3, it will be seen that in accordance with a preferred form of the present invention, threaded nuts 70 are welded to rear surfaces of front attachment posts 62 in alignment with post bore openings 72. Post bore openings 72 are in turn positioned for alignment with axle joining post bore openings 32, whereby to permit axle tubes 26 and 28 to be clamped within channels 46 and 48, respectively, by passing bolts 30 successively through bore openings 32 and 72 for threading into nuts 70. However, nuts 70 need not be permanently affixed to posts 62.

By again referring to FIG. 2, it will be noted that in the preferred form of the invention, side plates 50 are bent to define generally parallel front and rear attachment portions 50a and 50b, respectively, and forwardly convergent connecting or intermediate portions 50c.

The parallel relationship of portions 50a and 50b facilitates attachment of these portions to tubes 42, 44 and posts 62, respectively, whereas the convergent connecting portion 50c permits a "narrowing" of the front end of the modified VW frame as required to accommodate for the forwardly converging front hood design of many "antique" cars. Plates 50 are also strengthened by this construction.

From the foregoing, it will be understood that extension unit 10 may be placed in use by a simple series of operations including the removal of bolts 30 in order to disconnect front axle assembly 14 from bracket 16; the attachment of unit 10 to bracket 16 by the use of bolts 60; and the attachment of the front axle assembly 14 to unit 10 by the use of bolts 30. Alternatively, it is contemplated that bolts 30 and 60 may be replaced by a single set of bolts having a length sufficient to extend from axle posts 34 through unit 10 for threading into bracket openings 36. Also, if desired, device 10 may be permanently connected to both bracket 16 and axle tubes 26 and 28, as by a welding operation.

While the illustrated construction is preferred, since it has stood up well under actual road conditions and is relatively inexpensive to fabricate, it is anticipated that various modifications thereof may be made in addition to those mentioned above. In this respect, it is specifically anticipated that an integrally formed and suitably contoured metal forging or casting may be welded to plate rear portions 50a as a replacement for tubes 42, 44 and posts 54, whereas an integrally formed and suitably contoured metal forging or casting may be welded to plate front portions 50b as a replacement for channels 46, 48 and posts 62 and braces 66, 68.

I claim:

1. A unit for extending the frame of a car, which frame is characterized as having a bracket for mounting a front axle assembly of said car, said front axle assembly including horizontally extending upper and lower axle tubes and a pair of vertically disposed axle jointing posts bored to receive mounting bolts, said bracket being formed with upper and lower pairs of aligned concave mounting surfaces sized and spaced to receive said upper and lower axle tubes and threaded openings to receive said bolts whereby to permit said axle tubes to be removably clamped within said mounting surfaces, said unit comprising:
   a first assembly contoured to define upper and lower rearwardly facing convex attaching surfaces sized and arranged for receipt within said mounting surfaces, said first assembly being formed with through openings for receiving bolts by which said first assembly may be removably clamped against said bracket;
   a second assembly contoured to define upper and lower forwardly facing concave attachment surfaces sized and arranged for receiving said upper and lower axle tubes, said second assembly being formed with through openings for receiving bolts by which said front axle assembly may be removably clamped against said second assembly; and
   cantilever means connecting said second assembly to said first assembly in a horizontally spaced and essentially parallel relationship.

2. A unit according to claim 1, wherein said cantilever means comprises a pair of upstanding side plates having rear portions connected to opposite ends of said first assembly and front portions connected to opposite ends of said second assembly.

3. A unit according to claim 2, wherein said rear portions of said side plates are essentially parallel and have facing surfaces welded to opposite ends of said first assembly, said front portions of said side plates are essentially parallel and have facing surfaces welded to opposite ends of said second assembly, and said side plates additionally include forwardly converging portions interconnecting said rear and front portions.

4. A unit according to claim 2, wherein said first assembly includes a pair of parallel, vertically spaced rear attaching tubes opposite end affixed to said rear portions of said side plates and a pair of parallel rear attaching posts welded to forwardly facing surfaces of said attaching tubes, said convex attaching surfaces being defined by rearwardly facing surfaces of said attaching tubes, and said through openings of said first assembly being defined by said attaching posts.

5. A unit according to claim 2, wherein said second assembly includes a pair of vertically disposed attachment posts fixed one to each of said front portions of said side plates, said attachment posts defining said through openings of said second assembly, upper and lower pairs of aligned attachment channels, said attachment channels serving to define said concave attachment surfaces and being affixed adjacent their respective outer ends to said attachment posts, and a pair of parallel vertically spaced braces fixed adjacent their opposite ends to relatively inner ends of said attachment channels.

6. A unit according to claim 5, wherein said first assembly includes a pair of parallel, vertically spaced rear attaching tubes opposite end affixed to said rear portions of said side plates, and a pair of parallel rear attaching posts welded to forwardly facing surfaces of said attaching tubes, said convex attaching surfaces being defined by rearwardly facing surfaces of said attaching tubes, and said through openings of said first assembly being defined by said attaching posts.

7. A unit according to claim 6, wherein said rear portions are essentially parallel and have facing surfaces welded to opposite ends of said rear attaching tubes, said front portions are essentially parallel and have facing surfaces welded one to each of said attachment posts and said side plates additionally include forwardly converging portions interconnecting said rear and front portions.

* * * * *